United States Patent [19]

McIntosh et al.

[11] Patent Number: 5,320,213

[45] Date of Patent: Jun. 14, 1994

[54] ACCUMULATING RATCHET CONVEYOR

[75] Inventors: William E. McIntosh, Northfield; Steven A. Rahman, Oronoco; Alexander Vigdorovich, St. Paul; Mark R. Rosa, Inver Grove Heights, all of Minn.

[73] Assignee: The Cornelius Company, Anoka, Minn.

[21] Appl. No.: 42,844

[22] Filed: Apr. 5, 1993

Related U.S. Application Data

[63] Continuation of Ser. No. 955,819, Oct. 2, 1992, abandoned, which is a continuation of Ser. No. 925,704, Aug. 4, 1992, abandoned.

[51] Int. Cl.⁵ .............................................. B65G 25/00
[52] U.S. Cl. .................................... 198/744; 198/737; 198/468.9
[58] Field of Search ................ 198/468.9, 468.11, 737, 198/738, 741, 744, 747; 104/162

[56] References Cited

U.S. PATENT DOCUMENTS 3,807,550  4/1974  Taylor ................................. 198/738
5,115,907  5/1992  Pomara, Jr. ......................... 198/744

FOREIGN PATENT DOCUMENTS 2594099  8/1987  France ................................. 198/738
0072513  5/1982  Japan .................................. 198/741
1263592  10/1986  U.S.S.R. ............................. 198/744
0639003  6/1950  United Kingdom ................ 198/737

Primary Examiner—James R. Bidwell
Attorney, Agent, or Firm—Sten Erik Hakanson

[57] ABSTRACT

A bi-directional ratchet conveyor is shown including a carrier bar slideably mounted centrally of a frame and operated by a power cylinder. The carrier bar has a first plurality of gravity dogs pivotally secured along a first side thereof, and a second plurality of gravity dogs secured along a second side thereof oriented in an opposite direction from the first plurality of gravity dogs. Dog operating rods are slideably secured to each side of the carrier bar for independently operating the first and second plurality of dogs between active and neutral positions. Each dog operating rod is operated by a separate pneumatic cylinder. When the first plurality of dogs are maintained in an active position, the second plurality of dogs are maintained in a neutral position, thereby providing for movement of goods in one direction along the conveyor through repeated extension and retraction of the power cylinder. Conversely, when the second plurality of dogs are maintained in an active position, and the first plurality of dogs are maintained in a neutral position, the products are moveable in the opposite direction along the conveyor.

6 Claims, 4 Drawing Sheets

ACCUMULATING RATCHET CONVEYOR

This is a continuation of application Ser. No. 07/955,819, Oct. 2, 1992 now abandoned, which is a continuation of application Ser. No. 07/925,704, Aug. 4, 1992 now abandoned.

BACKGROUND

1. Field of the Invention

The present invention relates generally to ratchet conveyors, and particularly to ratchet conveyors that provide for movement in two directions.

2. Background of the Invention

Ratchet conveyors are known in the art and typically include a rigid central carrier bar operated in a back and forth motion by a hydraulic cylinder. The bar includes a plurality of gravity actuated dogs pivotally secured thereto for contacting and pushing objects such as carts, and the like. Thus, when the cylinder is extended, the dogs push against the surface of the object, moving it the length of the extending stroke of the cylinder. Conversely, when the cylinder retracts, the dog is designed to pivot downwardly underneath the object and then rotate to an up or contacting position when no longer blocked by the object. Therefore, subsequent re-extension of the cylinder provides for movement of the same or a further object. In this manner, articles are moved in a ratcheting or start and stop type motion from one end of the conveyor to the other.

Ratchet conveyors have various advantages, such as mechanical simplicity, durability and the ability to lie closely parallel each other, as a result of the cylinder drive means being located centrally thereof.

However, unlike continuous motor driven chain conveyors, which can include means for reversing motor direction and therefor chain movement, ratchet conveyors can only move a product in one predetermined direction depending on the way in which the dogs are mounted to the central bar. Accordingly, it would be desirable to have a ratchet conveyor that can provide for ratchet movement of products along the length thereof in either direction.

SUMMARY OF THE INVENTION

The present invention is a bi-directional ratchet conveyor. The invention herein includes a frame on which a carrier bar is centrally and slideably mounted. The carrier bar includes a plurality of gravity dogs pivotally secured thereto on both sides thereof. Specifically, each side of the carrier bar has a plurality of gravity dogs secured thereto, facing in an opposite direction to the opposing side. The carrier bar also includes a plurality of rod guide brackets secured to either side thereof for supporting dog actuating rods slideably mounted in the guides on either side of the carrier bar. Dog actuating cylinders are secured on either side of the carrier bar and are secured on one end to the carrier bar, and on their opposite ends to one of each of the dog actuating rods. The dog actuating rods each include a plurality of dog operating pins adjacent each pivotal dog. A main drive cylinder is mounted in the frame below the carrier bar for providing ratcheting operation thereof.

In operation, the dog operating cylinders are independently operable to move the dog operating bars from a neutral position to a dog operating position. In a dog operating position, the operating bar moves the pin from contact beneath the dog so that it can pivot downwardly, thus extending a portion of the dog above the carrier bar. Thus, all the dogs on one side of the carrier bar are simultaneously oriented for pushing a product in one direction. It will be appreciated by those of skill that the dog operating piston on the opposing side of the carrier bar remains in a neutral position wherein the dogs on the opposing side are supported by their corresponding pins for maintaining the dog in a horizontal or neutral position. Therefore, when movement is required in the opposite direction, the extension and retraction of the dog operating pistons is reversed so that the side that was formerly activated is now in the neutral position and the opposing side is then active.

DESCRIPTION OF THE DRAWINGS

A further understanding of the structure, operation, objects and advantages of the present invention can be had by referring to the following detailed description, which refers to the following figures, wherein.

DETAILED DESCRIPTION

Figure 4:
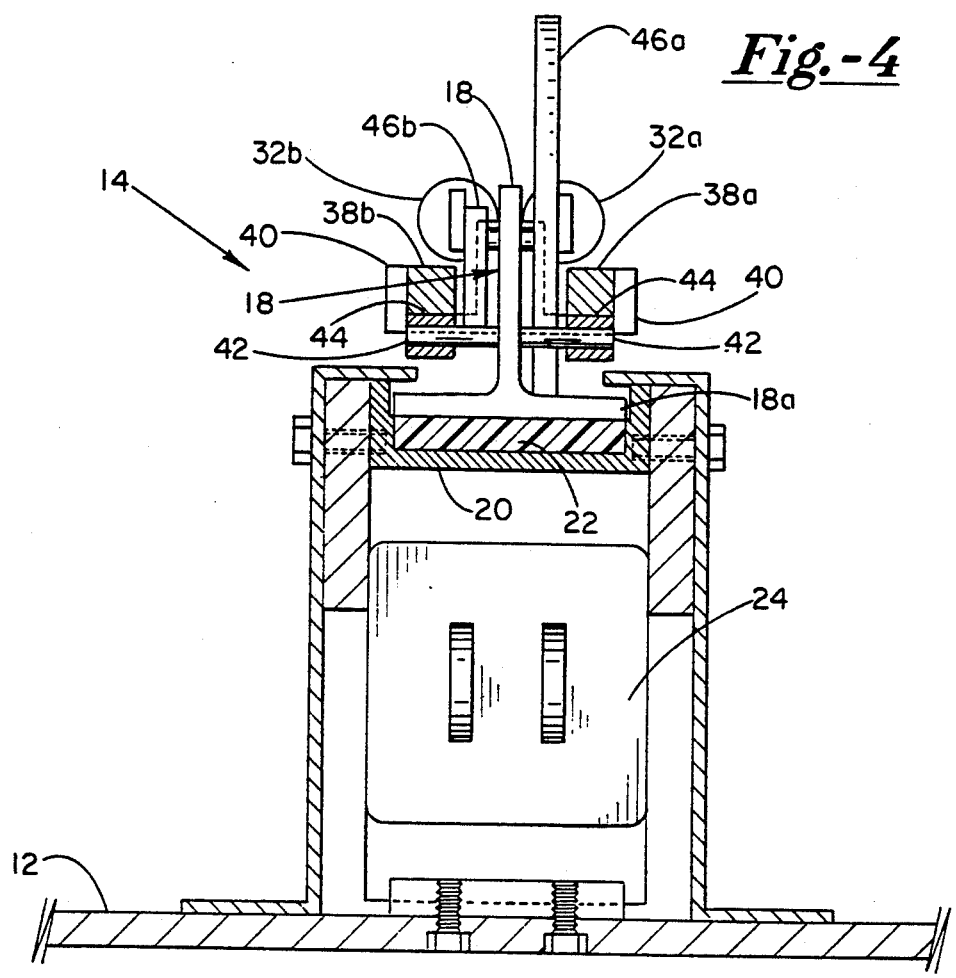
FIG. 4 shows an enlarged cross-sectional view of the present invention along lines 4—4 of FIG. 3.

The bi-directional conveyor of the present invention is seen in the various figures and generally referred to by the number 10. Conveyor 10 includes a framework 12 for supporting a central ratcheting portion 14 and a pair of cart tracks 16. As seen more specifically in FIG. 4, carrier operating portion 14 includes a T-shaped carrier bar 18 slideably mounted on a support 20. Support 20 is, in turn, secured to framework 12 and includes a high density plastic slide insert 22.

A first main drive cylinder 24 is secured within support 20 and includes a piston arm 24a pivotally secured to a mounting 26 secured to carrier bar 18. Cylinder 24 is secured on an opposite end thereof to a further shorter stroke cylinder 28. Cylinder 28 includes a piston arm 28a pivotally secured to a bracket 30, which bracket 30 is secured to framework 12.

Figure 3:
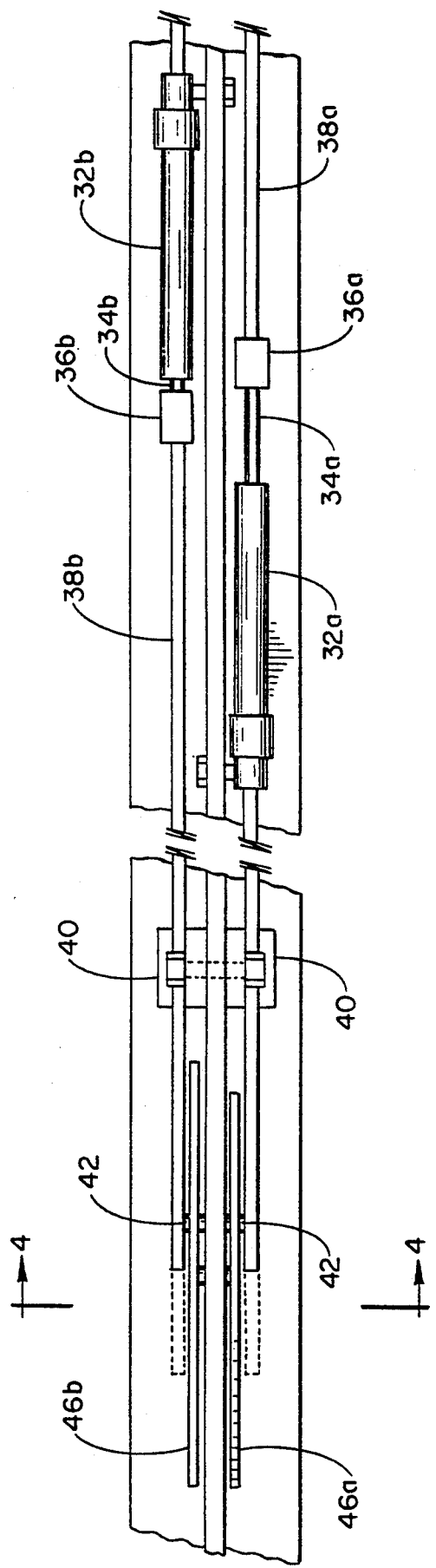
FIG. 3 shows an enlarged top plan view of the present invention.
Figure 5:
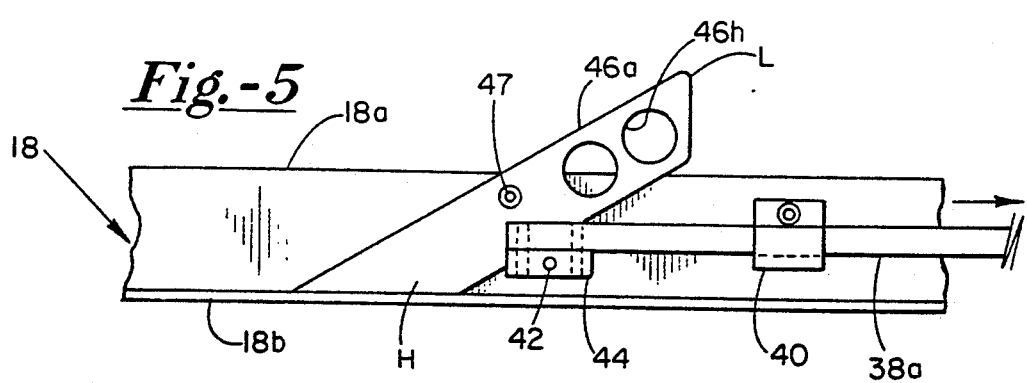
FIG. 5 shows an enlarged side plan view along lines 5—5 of FIG. 2 with an operating dog in an active position.
Figure 6:
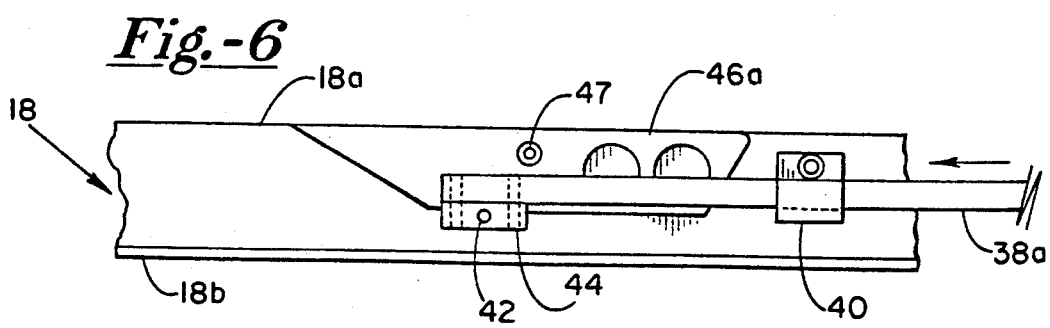
FIG. 6 shows the view as in FIG. 5 with an operating dog in a neutral position.

As seen by also referring to FIGS. 3, 5, and 6, the carrier 18 includes a pair of cylinders 32a and 32b secured to either side of the vertical portion 18a thereof. Cylinders 32a and 32b each include pistons 34a and 34b, respectively, which pistons 34a and 34b are secured to pivot mounting blocks 36a and 36b, respectively. Blocks 36a and 36b provide for securing of piston arms 34a and 34b to a pair of dog actuating rods 38a and 38b, respectively. Rods 38a and 38b are slideably supported by a plurality of L-shaped supports 40 secured to horizontal carrier portion 18a. Rods 38a and 38b include a plurality of dog operating pins 42 extending substantially horizontally from pin retaining brackets 44. A plurality of gravity operated dogs 46a and 46b are pivotally secured by pins 47 to carrier portion 18a on opposite sides thereof and oriented to face in opposite directions. Dogs 46a and 46b have a heavy end (H) and a light end (L). In the present invention, light end (L) is made by simply removing mass from that end as represented by holes 46h.

As seen by again referring to FIG. 1, a cart 48 is shown in phantom outline and includes a pair of wheels 48a for riding on tracks 16 and includes a base having end frame members 50 and central frame members 52. A limit switch 54 secured to either or both ends of conveyor 10, provides for sensing the presence of a cart 48 at such end.

It will be understood by those of skill that various cylinders of the present cylinder, whether pneumatically or hydraulically operated, require control valves and tubing for providing connection to a source of compressed air or hydraulic fluid. Also, as is well understood by those of skill, the operation of the cylinder control valves, and hence the cylinders, is regulated by a control means 56, shown in phantom outline in FIG. 1. Specifically, control means 56, such as a programmable logic controller, will typically receive inputs from proximity or limit switches, such as switch 54, or other such sensing means. These sensing means are located adjacent cylinders 24, 28, 32a and 32b, and, or the appropriate part moved thereby, such as carrier 18 and dog actuating bars 38a and 38b. In this manner, control 56 has information as to the full extension or retraction of the various cylinders based upon the positions of the components moved thereby so that the operation of the present invention can be controlled as desired. However, as the structure, function, and operation of such control components are well within the understanding of the relevant level of skill in the art, for the purpose of facilitating a clear understanding of the structure and operation of the present invention, such components are not included in the description or figures hereof.

Figure 1:
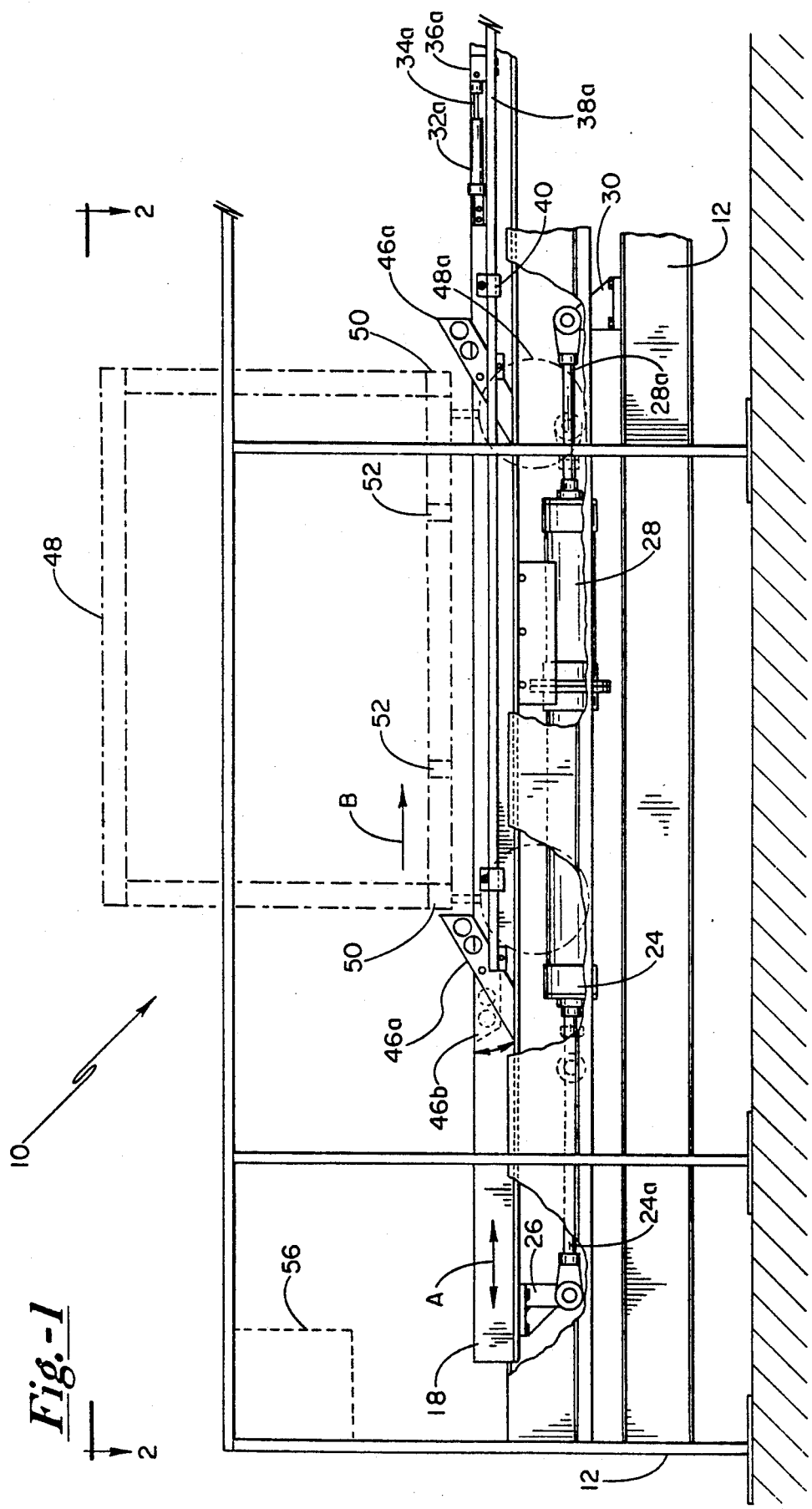
FIG. 1 shows a side plan view of the present invention.
Figure 2:
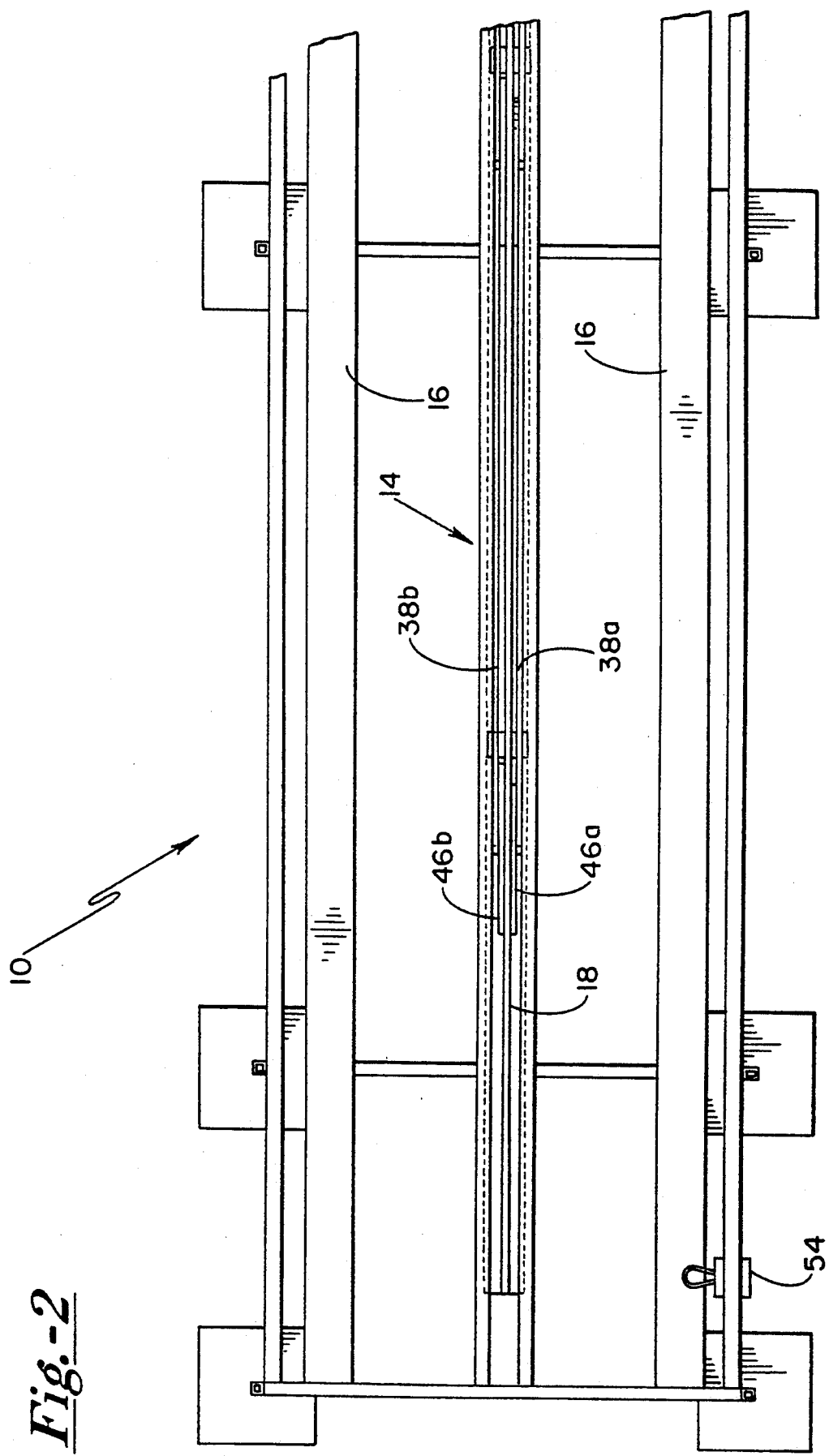
FIG. 2 shows a top plan view of the present invention along lines 2—2 of FIG. 1.

The operation of the present invention can be understood wherein the repeated extension and retraction of cylinder 24 results in the back and forth movement of carrier 18, as indicated by the arrow A in FIG. 1. The extension of cylinder 32a to the position as seen in FIG. 1 results in pins 42 moving from underneath dogs 46a so that the heavy ends (H) pivot downwardly due to gravity from the position as seen in FIG. 6 to the position as seen in FIG. 5. Thus, subsequent repeated extension and retraction of cylinder 24 will result in dogs 46a contacting the outer frame 50 or inner frame members 52 of a cart 48, moving the cart in a ratcheting motion in the direction as-indicted by arrow B in FIG. 1. It can be understood that retraction of cylinder 32a will conversely result in pin 42 moving underneath dog 46a, moving it from the active position as seen in FIG. 5, to the neutral or horizontal position as seen in FIG. 6. Therefore, it can now be understood that subsequent extension of cylinder 32b will likewise result in the moving of dogs 46b to the active position. However, as dogs 46b are mounted to face in an opposite direction to those of dogs 46a, extension and retraction of cylinder 24 will then result in movement of carts 48 in the opposite direction along conveyor 10. Therefore, either cylinder 32a or 32b can be extended to provide for moving into the active position of its respective set of dogs, 42a and 42b. Also, it will be understood that both cylinders can be maintained in the horizontal, or neutral dog position so that carts can be moved manually in either direction along conveyor 10.

Short stroke cylinder 28 provides for additional movement of carrier 18 when operated simultaneously with cylinder 24. Thus, cylinder 28 insures that a cart 48 is moved a sufficient distance so that the next dog can come into contact therewith and continue the movement thereof along conveyor 10. However, it can be understood that when a cart 48 reaches an end of conveyor 10 beyond which it can not travel, full extension of both cylinders 24 and 28 could result in damage to both the conveyor or cart. Thus, limit switch a 54 can signal to control 56 that at least one cart 48 is at an end of conveyor 10. Therefore, in such an accumulating conveyor situation the operation of carrier 18 generally must be stopped. However, in the present invention, dogs 46a and 46b are positioned on carrier 18 and the stroke of cylinder is sized to be slightly less than the spacing between cart members 52 so that some further movement of carts 48 can occur even after one or more carts 48 have been accumulated on one end of conveyor. Specifically, upon the making of switch 54 control means 56 calls for operation of cylinder 24 alone wherein either dogs 46a or 46b depending upon which set of dogs is in the active position, cycle harmlessly between frame members 52 of the accumulated cart or carts 48. However, since any unaccumulated carts 48 will be distributed at somewhat random positions along conveyor 10 at the time of making switch 54, continued cycling of cylinder 24 alone will result in some movement of such carts. In this manner, movement can occur in the desired direction as opposed to completely stopping the movement of carrier 18 and any further accumulation. Of course, when switch 54 is no longer made the operation of cylinder 28 can again be resumed.

It will be apparent to those of skill that various modifications can be made to the present invention that will remain within the spirit and scope thereof. For example, the embodiment shown herein is designed for moving wheeled carts. However, the present invention can be easily configured by those of skill to move various wheeled or non-wheeled objects, goods mounted on pallets or skids, and the like.

We claim:

1. An accumulating ratchet conveyor for transporting objects there along in a direction from a conveyor first end to a conveyor second end, the conveyor comprising: a frame, a carrier bar slideably mounted to the frame, a plurality of dog means pivotally secured to the carrier bar, a carrier drive means for alternately extending and retracting the carrier bar so that the dog means intermittently contact the objects for imparting movement thereto, the carrier drive means including a first linear actuating means for moving the carrier bar a first distance and a second linear actuating means for moving the carrier bar a second distance, the first and second linear actuating means operable by a control means wherein the control means provides for operating the first and second actuating means individually and coordinately so that the carrier bar is moveable a third distance when the first and second actuating means are operated coordinately and moveable the first or second distances when the first and second linear actuating means respectively are operated individually.

2. The conveyor as defined in claim 1, and the carrier bar mounted substantially centrally of the frame.

3. The conveyor as defined in claim 1, and the first and second linear actuating means comprising first and second drive cylinders, the first and second cylinders secured together forming a cylinder pair and the cylinder pair secured on one end thereof to the carrier and on an opposite end thereof to the frame so that extension of either or both the cylinders translates into motion imparted to the carrier bar.

4. The conveyor as defined in claim 1, and including an object sensing means on the conveyor second end for sensing the presence of a transported object at the second end, and the sensing means connected to the control means for stopping the operation of the first actuating means and continuing the operation of the second actuating means when an object is sensed at the second end wherein the second actuating means extends and retracts the carrier base the second distance selected so that the object at the conveyor second end and any other objects accumulated there against are not further contacted by a dog means and so that further movement of any objects not accumulated can occur in a direction from the conveyor first end to the conveyor second end.

5. The conveyor as defined in claim 3, and including an object sensing means on the conveyor second end for sensing the presence of a transported object at the second end, and the sensing means connected tot he control means for stopping the operation of the first drive cylinder and continuing the operation of the second drive cylinder when an object is sensed at the second end wherein the second actuating means extends and retracts the carrier bar the second distance selected so that the object at the conveyor second end and any other objects accumulated there against are not further contacted by a dog means and so that further movement of any objects not accumulated can occur in a direction from the conveyor first end to the conveyor second end.

6. The conveyor as defined in claim 5, and the carrier bar mounted substantially centrally of the frame.

* * * * *